United States Patent
Ishikawa et al.

(10) Patent No.: US 6,203,027 B1
(45) Date of Patent: Mar. 20, 2001

(54) STRUCTURE FOR SUPPORTING FLUID PRESSURE CYLINDERS USED TO CONTROL PIVOTING OF VEHICLE AXLES

(75) Inventors: Kazuo Ishikawa; Yasuhiro Niwa, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/162,220

(22) Filed: Sep. 28, 1998

(30) Foreign Application Priority Data

Oct. 15, 1997 (JP) .................................................. 9-282011

(51) Int. Cl.⁷ ................................................. B60G 21/073
(52) U.S. Cl. ........................ 280/6.154; 280/788; 280/755
(58) Field of Search ................................. 280/6.15, 6.153, 280/6.154, 755, 754, 787, 788, 795, 124.103, 124.106, 124.107, 124.109, 124.157, 124.154, 683

(56) References Cited

U.S. PATENT DOCUMENTS

| | | | |
|---|---|---|---|
| 2,407,092 | * 9/1946 | McNamara et al. | 280/795 |
| 3,142,363 | * 7/1964 | Tamini . | |
| 4,236,591 | * 12/1980 | Molby . | |
| 4,750,751 | 6/1988 | Schafer . | |
| 4,802,690 | * 2/1989 | Raidel | 280/124.157 |
| 4,936,423 | 6/1990 | Karnopp . | |
| 5,513,875 | * 5/1996 | Tahara et al. | 280/754 |
| 5,639,119 | 6/1997 | Plate et al. . | |

FOREIGN PATENT DOCUMENTS

| | | |
|---|---|---|
| 3632416 | 4/1988 | (DE) . |
| 505661 | 8/1990 | (DE) . |
| 4235264 | 4/1994 | (DE) . |
| 603394 | 6/1994 | (EP) . |
| 496749 | 9/1997 | (EP) . |
| 949887 | 9/1949 | (FR) . |
| 959747 | 4/1950 | (FR) . |
| 1307620 | 2/1963 | (FR) . |
| 1514879 | 5/1968 | (FR) . |
| 58-183307 | 10/1983 | (JP) . |
| 62-110509 | 5/1987 | (JP) . |
| 6191251 | * 7/1994 | (JP) . |
| 9315125 | 12/1997 | (JP) . |
| 9634776 | 7/1996 | (WO) . |

* cited by examiner

Primary Examiner—Paul N. Dickson
(74) Attorney, Agent, or Firm—Morgan & Finnegan, L.L.P.

(57) ABSTRACT

A structure for supporting a hydraulic cylinder that controls pivoting of a rear axle in a forklift. The rear axle is supported pivotally to the body. The hydraulic cylinder connects the rear axle to the body. Two hydraulic oil chambers are defined in the hydraulic cylinder. Movement of hydraulic oil between the oil chambers is selectively permitted and prohibited to selectively permit and prohibit pivoting of the rear axle. The body includes a pair of side frame members located on the sides of the body and a pair of cross frame members connected to the side frame members. The rear axle is located under the cross frame members. One end of the hydraulic cylinder is pivotally connected to the cross frame members by an upper joint. An upper pin, which is part of the upper joint, is directly supported by the cross frame members. Accordingly, an exclusive bracket for coupling the hydraulic cylinder to the body is not necessary. This simplifies the structure for coupling the hydraulic cylinder to the body.

29 Claims, 3 Drawing Sheets

STRUCTURE FOR SUPPORTING FLUID PRESSURE CYLINDERS USED TO CONTROL PIVOTING OF VEHICLE AXLES

BACKGROUND OF THE INVENTION

The present invention relates to a structure for supporting fluid pressure cylinders that are used to control pivoting of axles with respect to vehicle bodies.

A forklift includes a body, a rear axle supported by the body, and rear wheels mounted on the rear axle. Typically, the rear axle is pivotally supported with respect to the body. Thus, the axle pivots with respect to the body to constantly maintain traction between each wheel and the ground surface even when the forklift travels along bumpy surfaces. However, the pivotal structure of the axle may reduce the driving stability of the forklift. For example, the forklift's center of gravity may be raised due to the load being carried. In such state, if the forklift is steered in a sudden manner when changing direction, centrifugal force acting laterally on the forklift (lateral acceleration) may tilt the forklift body. Accordingly, an axle locking apparatus has been proposed to stabilize the forklift under such circumstances. The apparatus restricts the pivoting of the axle with respect to the body when a detected yaw acceleration or lateral acceleration exceeds a predetermined value.

As shown in FIG. 4, the apparatus includes a hydraulic cylinder 22, which is located between a body 20 and a rear axle 21. The cylinder has two hydraulic oil chambers that are connected to each other by a passage. An electromagnetic valve 23 is arranged in the passage. The electromagnetic valve 23 closes the passage to stop the movement of hydraulic oil between the two oil chambers. This locks the hydraulic cylinder 22 and prohibits pivoting of the rear axle 21 with respect to the body 20. To permit pivoting of the rear axle 21 relative to the body 20, the electromagnetic valve 23 opens the passage. This allows movement of hydraulic oil between the two oil chambers and thus unlocks the hydraulic cylinder 22.

An upper bracket 24 is welded to the body 20 to support the hydraulic cylinder 22. As shown in FIGS. 4 and 5, the upper bracket 24 has a base plate 27 and a pair of parallel support plates 28 fixed to the base plate 27. An upper pin 25 is supported by the support plates 28 and is parallel to the pivoting axis of the rear axle 21. The hydraulic cylinder 22 has a cylinder tube. An upper anchor 26 having a bore is defined at the top portion of the cylinder tube. The upper anchor 26 is held between the support plates 28 with the upper pin 25 extending through the anchor bore. Accordingly, the hydraulic cylinder 22 is pivotally connected to the body 20.

As shown in FIG. 4, a lower bracket 30 is fixed to the rear axle 21. A lower pin 29 is supported by the bracket 30 and is parallel to the pivoting axis of the rear axle 21. A lower anchor 26 having a bore is defined at the bottom portion of the cylinder tube. The lower pin 29 extends through the bore of the lower anchor 26. This pivotally connects the hydraulic cylinder 22 to the rear axle 21.

The upper bracket 24 is produced exclusively to connect the hydraulic cylinder 22 to the body 20. However, the employment of the single-purpose bracket 24 not only increases the number of components required to support the hydraulic cylinder 22 but also complicates the structure for coupling the hydraulic cylinder 22 to the body 20. Thus, the employment of the bracket 24 results in additional tasks during production of the forklift and thus lowers efficiency.

SUMMARY OF THE INVENTION

Accordingly, it is an objective of the present invention to provide a simplified structure for coupling fluid pressure cylinders, which control pivoting of axles, to vehicle bodies.

To achieve the above objective, the present invention provides a structure for supporting a fluid pressure cylinder that is used to control pivoting of a vehicle axle. The axle is supported pivotally with respect to a vehicle body. The fluid pressure cylinder includes an upper end pivotally connected to the body by an upper joint, a lower end pivotally connected to the axle by a lower joint, and a movable piston rod. Pivoting of the axle is permitted when movement of the piston rod is permitted and restricted when movement of the piston rod is restricted. The support structure includes a framework constituting part of the body. The framework directly supports the upper joint.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
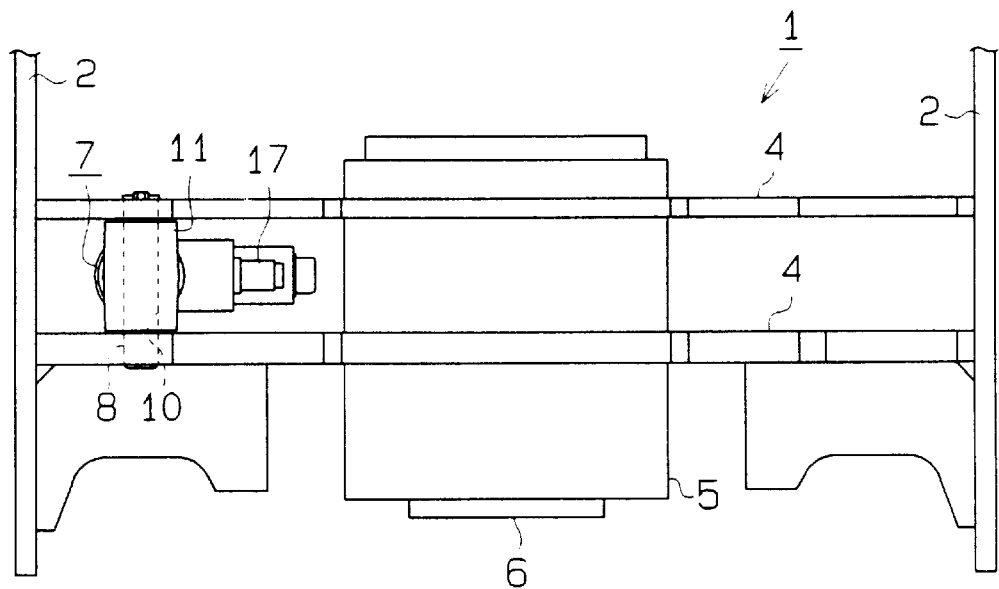
FIG. 1 is a partial plan view showing the rear section of a forklift according to the present invention.
Figure 2:
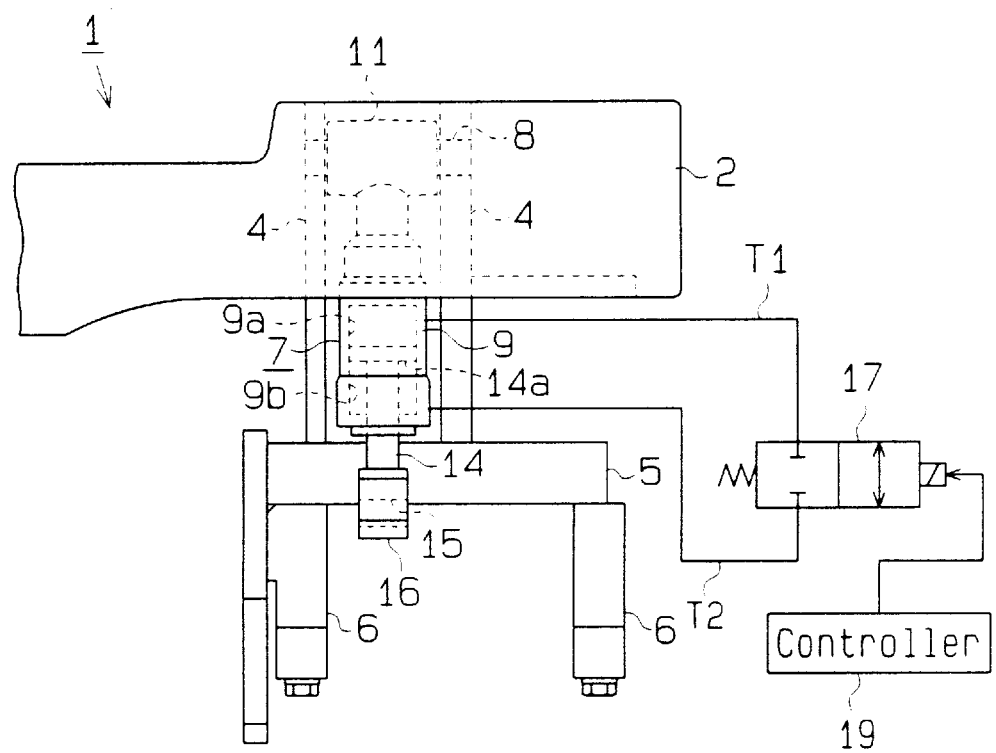
FIG. 2 is a schematic side view of the body of FIG. 1.
Figure 3:
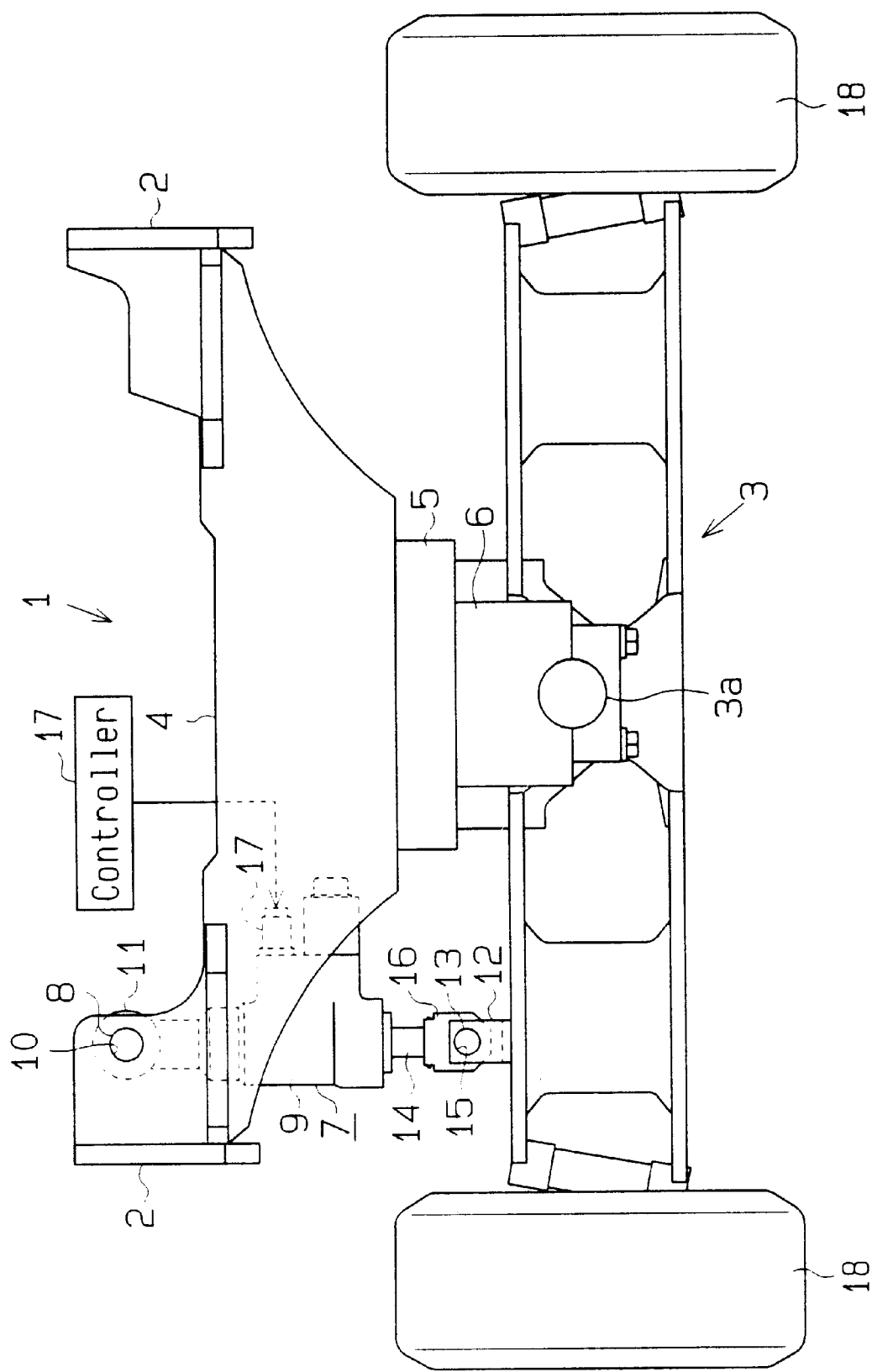
FIG. 3 is a schematic rear view of the body of FIG. 1.

A preferred embodiment according to the present invention employed in a forklift will now be described with reference to the drawings. As shown in FIGS. 1 to 3, a forklift body 1 includes a pair of parallel side frame members 2. The side frame members 2 are each made of a metal plate and arranged on either side of the body 1. A pair of parallel cross frame members 4 are connected to the rear portions of the two side frame members 2. Each cross frame member 4 is made of a metal plate and extends laterally relative to the body 1. The cross frame members 4 span nearly the entire width of the vehicle. Each frame member 2, 4 has planar surfaces that extend vertically. Together, the frame members 2, 4 form a framework that is part of the supporting structure of the body. That is, the frame members 2, 4 transmit a substantial portion of the vehicle weight to the pivotal coupling between an axle 3 and the body 1.

A fixed plate 5 is fixed to the middle portion of the two cross frame members 4. A pair of support plates 6 extend downward from the fixed plate 5. A rear axle 3, which extends in the lateral direction of the body 1, is pivotally connected to the support plates 6 by a center pin 3a. The rear axle 3 is pivotal about the center pin 3a in the plane of FIG. 3. A rear wheel 18 is mounted on each end of the rear axle 3. The rear wheels 18 are steered to change the direction of the forklift.

A hydraulic cylinder 7 is connected to the body 1 by an upper joint. The upper joint includes two cooperating parts; a first part, which is connected to the body 1, and a second part, which is connected to the cylinder 7. In the embodiment of FIG. 1, the first part is formed by an upper pin 8. The upper pin 8 is directly fixed to one end of each of the two cross frame members 4 and extends in the longitudinal direction of the body 1. The upper pin 8 is cylindrical and made of metal. The hydraulic cylinder 7 includes a cylinder tube 9. An upper anchor 11, which has a bore 10, is defined at the top portion of the cylinder tube 9. The second part of the upper joint is formed by the upper anchor 11.

The upper pin 8 is inserted into the bore 10 with the upper anchor 11 arranged between the two cross frame members 4. Therefore, the outer surface of the upper pin 8 makes sliding contact with the surface of the bore 10. This pivotally connects the hydraulic cylinder 7 to the body 1. The axis of the upper pin 8 is parallel to that of the center pin 3a. Accordingly, the hydraulic cylinder 7 may pivot with respect to the body 1 about an axis that is parallel to the pivoting axis of the rear axle 3.

As shown in FIG. 3, a bracket 12 is fixed to the top surface of one end of the rear axle 3. The hydraulic cylinder 7 is connected to the bracket 12 by a lower joint, which has two cooperating parts. The first part of the lower joint is connected to the bracket 12, and the second part is connected to the cylinder 7. In the embodiment of FIG. 1, the first part is formed by a lower pin 13. The lower pin 13 is supported by the bracket 12 and extends in the longitudinal direction of the body 1. As shown in FIGS. 2 and 3, the hydraulic cylinder 7 includes a piston rod 14. A lower anchor 16 having a bore 15 is defined at the bottom end of the piston rod 14. The lower anchor 16 forms the second part of the lower joint in the illustrated embodiment. The lower pin 13 is inserted through the bore 15 to pivotally connect the hydraulic cylinder 7 to the rear axle 3. The axis of the lower pin 13 is parallel to that of the center pin 3a. Accordingly, the hydraulic cylinder 7 may pivot with respect to the rear axle 3 about an axis that is parallel to the pivoting axis of the rear axle 3.

The hydraulic cylinder 7 is a multiple movement type cylinder and has a pair of hydraulic oil chambers 9a, 9b, which are defined by a piston 14a in the cylinder tube 9. The oil chambers 9a, 9b are connected to each other through passages T1, T2. As shown in FIGS. 2 and 3, an electromagnetic valve 17 is formed integrally with the hydraulic cylinder 7 between the passages T1, T2. An accumulator (not shown) for accumulating hydraulic oil is connected to the passages T1, T2. A controller 19 controls the electromagnetic valve 17 in accordance with signals indicating the traveling state of the forklift, such as signals indicating the yaw acceleration and lateral acceleration, to stabilize the forklift.

The electromagnetic valve 17 closes the passages T1, T2 to stop the movement of hydraulic oil between the oil chambers 9a, 9b. This prohibits movement of the piston rod 14. As a result, the hydraulic cylinder 7 locks the rear axle 3 to the body 1 and prohibits relative pivoting. The piston rod 14 is released when the movement of hydraulic oil between the oil chambers 9a, 9b is permitted as the electromagnetic valve 17 opens the passages T1, T2. This allows pivoting of the rear axle 3 with respect to the body 1.

Figure 4:
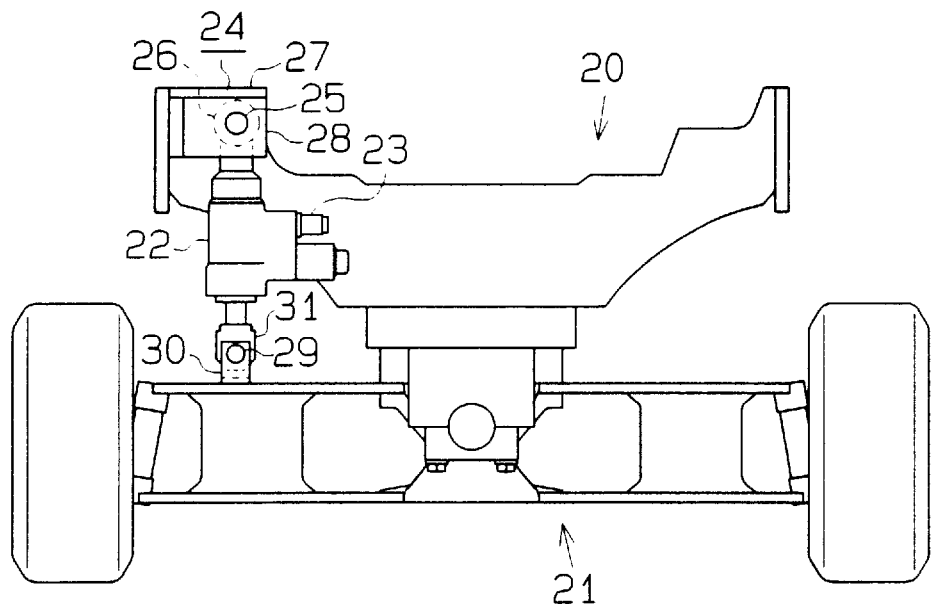
FIG. 4 is a rear view showing the body of a prior art forklift.
Figure 5:
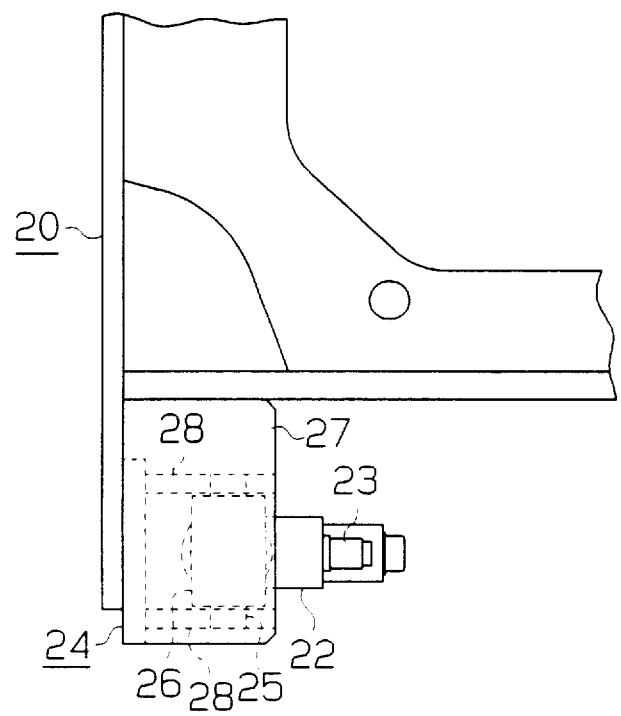
FIG. 5 is a partial enlarged plan view of the body of FIG. 4.

As described above, the hydraulic cylinder 7 is connected to the body 1 by the upper pin 8. The upper pin 8 is directly supported by the cross frame members 4, which are part of the body 1. Therefore, a separate, exclusive bracket for coupling the hydraulic cylinder to the body such as that employed in the prior art (FIGS. 4 and 5) need not be provided. This decreases the number of components and simplifies the structure for coupling the hydraulic cylinder 7 to the body 1. Therefore, production of the forklift is facilitated.

The body 1 is connected to the rear axle 3 through the upper pin 8 and the two parallel cross frame members 4. In addition, each cross frame member 4 is arranged such that its planar surface is perpendicular to the pivoting axis of the rear axle 3. Therefore, the force applied to the cross frame members 4 by the rear axle 3 through the hydraulic cylinder 7 acts in a direction parallel to the planar surfaces of the cross frame members 4. Plate materials have higher strength in the direction of their plane in comparison to that in a direction normal to their plane. Accordingly, the cross frame members 4 are well suited to resist forces applied by the hydraulic cylinder 7 from the rear axle 3.

With regard to the hydraulic cylinder 7, the relatively heavy cylinder tube 9 is coupled to the body 1, while the lighter piston rod 14 is coupled to the rear axle 3. Since the piston rod 14 moves integrally with the rear axle 3, the piston rod 14 should be light so that the piston rod 14 can respond quickly to the pivoting of the rear axle 3 as the rear axle 3 follows the road surface. Accordingly, it is preferred that the hydraulic cylinder 7 be oriented so that the relatively light piston rod 14 is connected to the rear axle 3.

It should be apparent to those skilled in the art that the present invention may be embodied in many other specific forms without departing from the spirit or scope of the invention. More particularly, the present invention may be embodied as described below.

In the preferred and illustrated embodiment, two cross frame members 4 are employed. However, if only one cross frame member 4 is employed, a support plate would be secured to the side frame member 2 that is located on the left side of the body 1 (as viewed in FIG. 1). In such case, the upper pin 8, which is used to connect the hydraulic cylinder 7 to the body 1, would be supported by the support plate and the cross frame member 4. Thus, the hydraulic cylinder 7 can be directly coupled to the body 1 merely by adding the support plate. This simplifies the structure for connecting the hydraulic cylinder 7 to the body 1 in comparison with the prior art structure shown in FIGS. 4 and 5.

In the preferred and illustrated embodiment, a single hydraulic cylinder 7 is arranged between one end of the rear axle 3 and the body 1. However, two hydraulic cylinders 7 may be arranged between the rear axle 3 and the body 1, with one cylinder 7 located on each end of the rear axle 3.

A cylinder using nitrogen gas or the like may be employed in lieu of the hydraulic cylinder 7. Such a cylinder would not completely lock the piston rod when the electromagnetic valve 17 closes the passages T1, T2. In other words, this cylinder would restrict pivoting of the rear axle 3 but not prohibit pivoting.

The frame members 2, 4 need not be flat plates. For example, the frame members 2, 4 may be replaced by beams having a square or elliptic cross-section. Furthermore, the frame members 2, 4 may be solid or hollow. If the frame members 2, 4 are hollow, they can be reinforced with ribs.

The frame members 2, 4 may be formed from materials such as steel, aluminum alloy, or fiber reinforced synthetic resin.

In the preferred and illustrated embodiment, the cylinder tube 9 is connected to the body 1, while the piston rod 14 is connected to the rear axle 3. However, the cylinder tube 9 may be connected to the rear axle 3 and the piston rod 14 may be connected to the body 1. This would lower the center of gravity of the vehicle.

Various kinds of joints can replace the simple cylindrical pivot joints formed by the pins 8, 13 and their associated bores 10, 15. For example, ball and socket joints can be used. More specifically, a spherical sliding surface, or ball, may be fitted on or formed integrally with the upper pin 8. In this case, a socket having a concave sliding surface would be provided in the bore 10 of the upper anchor 11 to receive the ball. The ball and the socket make surface contact with each other. Alternatively, a cylindrical bearing having an inner surface to receive the ball may be fitted into the anchor bore 10. In this case, the inner surface of the bearing comes into circular line contact with the surface of the ball. Such structures would not only allow the hydraulic cylinder 7 to pivot about an axis parallel to the pivoting axis of the rear axle 3 but also allow the hydraulic cylinder 7 to pivot freely in any direction about the joint of the upper pin 8. In the same manner, the structure for coupling the connecting rod to the cylinder may be changed arbitrarily.

The application of the present invention is not limited to forklifts. For example, the present invention may be applied to other types of industrial vehicles such as shovel loaders or truck cranes. The present invention may also be applied to other types of vehicles such as automobiles and buses.

Therefore, the present examples and embodiments are to be considered as illustrative and not restrictive, and the invention is not to be limited to the details given herein, but may be modified within the scope and equivalence of the appended claims.

What is claimed is:

1. A structure supporting a fluid pressure cylinder that is used to control pivoting of a vehicle axle, wherein the axle is supported pivotally with respect to a vehicle body, and wherein the fluid pressure cylinder includes an upper end pivotally connected to the body by an upper joint, a lower end pivotally connected to the axle by a lower joint, and a movable piston rod, wherein pivoting of the axle is permitted when movement of the piston rod is permitted and restricted when movement of the piston rod is restricted, and wherein the support structure comprises:

a framework constituting part of the body, the framework transmitting a substantial portion of the vehicle weight to the pivotal support of the axle, the framework comprising:

a first side frame member located on one side of the body and a second side frame member located on an opposite side of the body; and a pair of cross frame members connecting the side frame members, wherein the cross frame members directly support the upper joint and the axle is located below the cross frame members.

2. The support structure according to claim 1, wherein each cross frame member is a plate having a planar surface generally perpendicular to the pivoting axis of the axle.

3. The support structure according to claim 1, wherein the fluid pressure cylinder includes a cylinder tube connected to the upper joint, and wherein the piston rod is connected to the lower joint.

4. The support structure according to claim 1, wherein the pivot axes of the upper and lower joints are generally parallel to the pivoting axis of the axle.

5. The support structure according to claim 1, wherein the fluid pressure cylinder includes a pair of fluid chambers connected to one another through a regulated passage, movement of the piston rod is permitted when movement of the fluid between the fluid chambers is permitted, and movement of the piston rod is prohibited when movement of fluid between the fluid chambers is stopped, wherein prohibition of the piston rod movement restricts pivoting of the axle.

6. The support structure according to claim 5, further comprising a valve located in the regulated passage for selectively permitting and prohibiting movement of fluid between fluid chambers.

7. The support structure according to claim 1, wherein the vehicle body is part of an industrial vehicle including a forklift, the industrial vehicle having a pair of rear wheels respectively mounted on the ends of the axle.

8. A support structure comprising a vehicle body, a vehicle axle and a fluid pressure cylinder that is used to control pivoting of the vehicle axle, wherein the vehicle axle is supported pivotally with respect to the vehicle body, and wherein the fluid pressure cylinder includes an upper end pivotally connected to the body by an upper joint, a lower end pivotally connected to the axle by a lower joint, a movable piston rod, and a piston defining a pair of fluid chambers, wherein pivoting of the axle is permitted when movement of the piston rod is permitted and restricted when movement of the piston rod is restricted, the vehicle body comprising:

a pair of substantially parallel side frame members constituting part of the body, each side frame member being located on a respective side of the vehicle body; and a pair of substantially parallel cross frame members between the side frame members, connecting the side frame members, the axle being located below the cross frame members; and the structure further comprising an upper pin directly supported by the cross frame members, wherein the upper pin is part of the upper joint and supports the upper end of the fluid pressure cylinder.

9. The support structure according to claim 8, wherein each cross frame member is a plate having a planar surface that is generally perpendicular to the pivoting axis of the axle.

10. The support structure according to claim 8, wherein the fluid pressure cylinder includes a cylinder tube connected to the upper pin, and the piston rod is connected to the lower joint.

11. The support structure according to claim 8, wherein the pivot axes of the upper and lower joints are generally parallel to the pivoting axis of the axle.

12. The support structure according to claim 8, wherein the vehicle includes a valve for selectively permitting and prohibiting movement of fluid between fluid chambers, the valve being located in a passage extending from one of the fluid chambers to the other.

13. The support structure according to claim 8, wherein the vehicle is an industrial vehicle including at least a forklift, the industrial vehicle having a pair of rear wheels respectively mounted on the ends of the axle.

14. A support structure of an industrial vehicle, the support structure comprising a vehicle body, an axle and a fluid pressure cylinder, the axle being pivotally connected to the body with a pivotable coupling such that the axle pivots about an axle pivoting axis, and the fluid pressure cylinder includes an upper end pivotally coupled to the vehicle body through an upper joint and a lower end pivotally coupled to the axis through a lower joint such that the fluid pressure cylinder regulates pivoting motion of the axle with respect to the vehicle body, the upper joint including a first part fixed to the vehicle body and a second part fixed to the fluid pressure cylinder, and the lower joint including a first part connected to the axle and a second part connected to the fluid pressure cylinder, wherein the first parts slide with respect to the second parts, respectively, to permit movement of the joints, the vehicle body comprising:

a pair of parallel cross members, each spanning a substantial portion of the vehicle's width and extending in the lateral direction of the vehicle in a position over the axle, the cross members being spaced apart from one another, wherein the first part of the upper joint is located between the cross members and is fixed directly to the cross members, so that forces applied to the upper joint by the fluid pressure cylinder are transmitted directly from the first part of the upper joint to the cross members without being transmitted through intervening parts.

15. The supporting structure of claim 14, wherein the cross members are vertically oriented plates, the plates each having planar surfaces that are perpendicular to the pivoting axis of the axle.

16. The supporting structure of claim 14, wherein the fluid pressure cylinder has an upper chamber and a lower chamber, the upper chamber being separated from the lower chamber by a piston, and the upper chamber is connected to the lower chamber by a regulated passage, the regulated passage including a valve, wherein the valve is closed to restrict movement of the axle relative to the body.

17. The supporting structure of claim 14, wherein the cross members are connected together at their ends, respectively, by a pair of side members, the side members extending parallel to the pivoting axis of the axle.

18. The supporting structure of claim 14, wherein the first part of the upper joint is a cylindrical pin that is directly fixed at each end to one of the cross members, the pin having a longitudinal axis that extends parallel to the pivoting axis of the axle.

19. The supporting structure of claim 14, wherein the cross members are weight transmitting parts of a framework that transmit a substantial portion of the weight of the vehicle to the pivotal coupling between the body and the axle.

20. A vehicle structure comprising:
a vehicle body comprising a pair of substantially parallel side frame members located at opposing sides of the body and a pair of substantially parallel cross frame members between the side frame members, the cross frame members connecting the side frame members;
an axle below the cross frame members, pivotally connected to the vehicle body; and
a fluid pressure cylinder for controlling pivoting of the axle, an upper end of the cylinder being pivotally connected directly to the cross frame members and a lower end of the cylinder being pivotally connected to the axle.

21. The vehicle structure of claim 20, further comprising a pin connecting the upper end of the cylinder directly to the cross-frame members.

22. The vehicle structure of claim 20, further comprising a pin pivotally connecting the upper end of the cylinder to each of the cross frame members between the side frame members.

23. The vehicle structure according to claim 20, wherein each cross frame member is a plate having a planar surface generally perpendicular to the pivoting axis of the axle.

24. The vehicle structure according to claim 20, wherein the fluid pressure cylinder includes a cylinder tube connected to the upper joint, and the piston rod is connected to the lower joint.

25. The vehicle structure according to claim 20, wherein the pivot axes of the upper and lower joints are generally parallel to the pivoting axis of the axle.

26. The vehicle structure according to claim 20, wherein the fluid pressure cylinder includes a pair of fluid chambers connected to one another through a regulated passage, movement of the piston rod is permitted when movement of the fluid between the fluid chambers is permitted, and movement of the piston rod is prohibited when movement of fluid between the fluid chambers is stopped, wherein prohibition of the piston rod movement restricts pivoting of the axle.

27. The vehicle structure according to claim 26, further comprising a valve located in the regulated passage for selectively permitting and prohibiting movement of fluid between fluid chambers.

28. The vehicle structure according to claim 20, further comprising a forklift, and a pair of rear wheels, the wheels being respectively mounted on the ends of the axle.

29. The vehicle structure of claim 20, wherein the side frame members and the cross frame members transmit a substantial portion of the vehicle weight to the pivotal support of the axle.

* * * * *